(12) United States Patent
Wang et al.

(10) Patent No.: US 9,367,155 B2
(45) Date of Patent: Jun. 14, 2016

(54) TOUCH PANEL ASSEMBLY AND ELECTRONIC DEVICE

(71) Applicant: HTC Corporation, Taoyuan County (TW)

(72) Inventors: Chi-Jer Wang, Taoyuan County (TW);
Shih-Po Chien, Taoyuan County (TW);
Pi-Lin Lo, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 211 days.

(21) Appl. No.: 14/043,809

(22) Filed: Oct. 1, 2013

(65) Prior Publication Data

US 2015/0092120 A1    Apr. 2, 2015

(51) Int. Cl.
*G06F 3/041* (2006.01)
*H04M 1/02* (2006.01)
*G06F 1/16* (2006.01)

(52) U.S. Cl.
CPC .............. *G06F 3/041* (2013.01); *G06F 1/1643* (2013.01); *H04M 1/0266* (2013.01)

(58) Field of Classification Search
None
See application file for complete search history.

(56) References Cited

U.S. PATENT DOCUMENTS

| | | | |
|---|---|---|---|
| 2005/0180099 | A1 | 8/2005 | Lin et al. |
| 2011/0012845 | A1* | 1/2011 | Rothkopf ................ G06F 3/044 345/173 |
| 2013/0321322 | A1* | 12/2013 | Kim ....................... G06F 3/0416 345/173 |
| 2014/0218629 | A1* | 8/2014 | Chuang et al. .................. 349/12 |

FOREIGN PATENT DOCUMENTS

TW    M370130    12/2009

OTHER PUBLICATIONS

"Office Action of Taiwan Counterpart Application", issued on Jan. 14, 2015, p. 1-p. 3.

* cited by examiner

*Primary Examiner* — Kenneth B Lee, Jr.
(74) *Attorney, Agent, or Firm* — Jianq Chyun IP Office

(57) ABSTRACT

A touch panel assembly including a touch panel and a flexible printed circuit board is provided. The touch panel includes a sensing area, at least one input element, a bonding area, a plurality of first connecting traces and a plurality of second connecting traces. The sensing area has a sensing array. The input element is located at a side of the sensing area. The bonding area is located between the sensing area and the input element. The first connecting traces and the second connecting traces are connected with the sensing array and the input element respectively and extend into bonding area. The flexible printed circuit board has a bonding portion. The flexible printed circuit board is attached to the bonding area through the bonding portion, and is electrically connected to the first connecting traces and the second connecting traces. An electronic device is also provided.

20 Claims, 5 Drawing Sheets

TOUCH PANEL ASSEMBLY AND ELECTRONIC DEVICE

BACKGROUND

1. Field of the Application

The disclosure relates to a panel assembly and an electronic device, and more particularly, to a touch panel assembly and an electronic device using the touch panel assembly.

2. Description of Related Art

In recent years, along with the rapid development and application of digital information and wireless communication technologies, conventional input devices, such as keyboard and mouse, of many electronic information products, such as mobile phone, handheld PC and smart phone, have been replaced by touch panels in order to allow users to operate such electronic information products more conveniently. The touch panels can be generally categorized into resistive touch panels, capacitive touch panels, optical touch panels, acoustic wave touch panels, and electromagnetic touch panels based on touch sensing techniques thereof. Capacitive touch panels have been broadly applied to different electronic products due to their fast response time, high reliability, and high durability.

On the other hand, many electronic products have currently replaced mechanical buttons disposed on their bodies with touch buttons (i.e., shortcut keys disposed on the front surface of the smart phones that are configured to connect the home page or to return to the previous page), so that the electronic products may have more aesthetic appearances. Now, since a touch panel concurrently has a sensing area and a touch button thereon, connecting traces on the touch panel are increased, thereby causing the connecting traces to occupy a wiring space on the touch panel. In addition, the touch panel usually has a bonding area to enable the sensing area of the touch panel to connect with an external circuit board, such as a flexible printed circuit board (FPC), so as to input driving signals or output sensing signals. When a mechanical button of an electronic product is replaced by the touch button, an additional circuit board is required on the touch panel to form the touch button, and thus the production cost of the electronic product is increased.

SUMMARY OF THE APPLICATION

The disclosure provides a touch panel assembly having favorable wiring and capable of lowering production cost.

The disclosure provides an electronic device having a lower production cost.

The touch panel assembly of the disclosure includes a touch panel and a flexible printed circuit board. The touch panel includes a sensing area, at least one input element, a bonding area, a plurality of first connecting traces and a plurality of second connecting traces. The sensing area has a sensing array. The input element is located at a side of the sensing area. The bonding area is located between the sensing area and the input element. The first connecting traces are connected with the sensing array respectively and extend into the bonding area. The second connecting traces are connected with the input element respectively and extend into the bonding area. The flexible printed circuit board has a bonding portion. The flexible printed circuit board is attached to the bonding area through the bonding portion, and is electrically connected to the first connecting traces and the second connecting traces.

The electronic device of the disclosure includes a casing, a display module and a touch panel assembly. The casing has an opening. The display module is disposed within the casing, and the opening exposes a display surface of the display module. The touch panel assembly is disposed within the casing. The touch panel assembly includes a touch panel and a flexible printed circuit board. The touch panel is disposed on the display surface. The touch panel includes a sensing area, at least one input element, a bonding area, a plurality of first connecting traces and a plurality of second connecting traces. The sensing area has a sensing array. The input element is located at a side of the sensing area. The bonding area is located between the sensing area and the input element. The first connecting traces are connected with the sensing array respectively and extend into the bonding area. The second connecting traces are connected with the input element respectively and extend into the bonding area. The flexible printed circuit board has a bonding portion, wherein the flexible printed circuit board is attached to the bonding area through the bonding portion, and is electrically connected to the first connecting traces and the second connecting traces.

In view of the foregoing, the touch panel assembly of the disclosure includes the touch panel and the flexible printed circuit board, wherein the bonding area of the touch panel is located between the sensing area and the input element, so that the sensing area and the input element may be electrically connected the bonding area located between the first connecting traces and the second connecting traces through the first connecting traces and the second connecting traces respectively, and the flexible printed circuit board is attached to the boding area through the bonding portion, so as to enable the sensing area and the input element to electrically connect to the flexible printed circuit board through the first connecting traces and the second connecting traces. As such, the touch panel assembly of the disclosure has favorable wiring, and the input element is disposed on the touch panel, so that the touch panel assembly and the electronic device can omit the use of additional flexible printed circuit board in producing the input element, thereby lowering the production cost.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
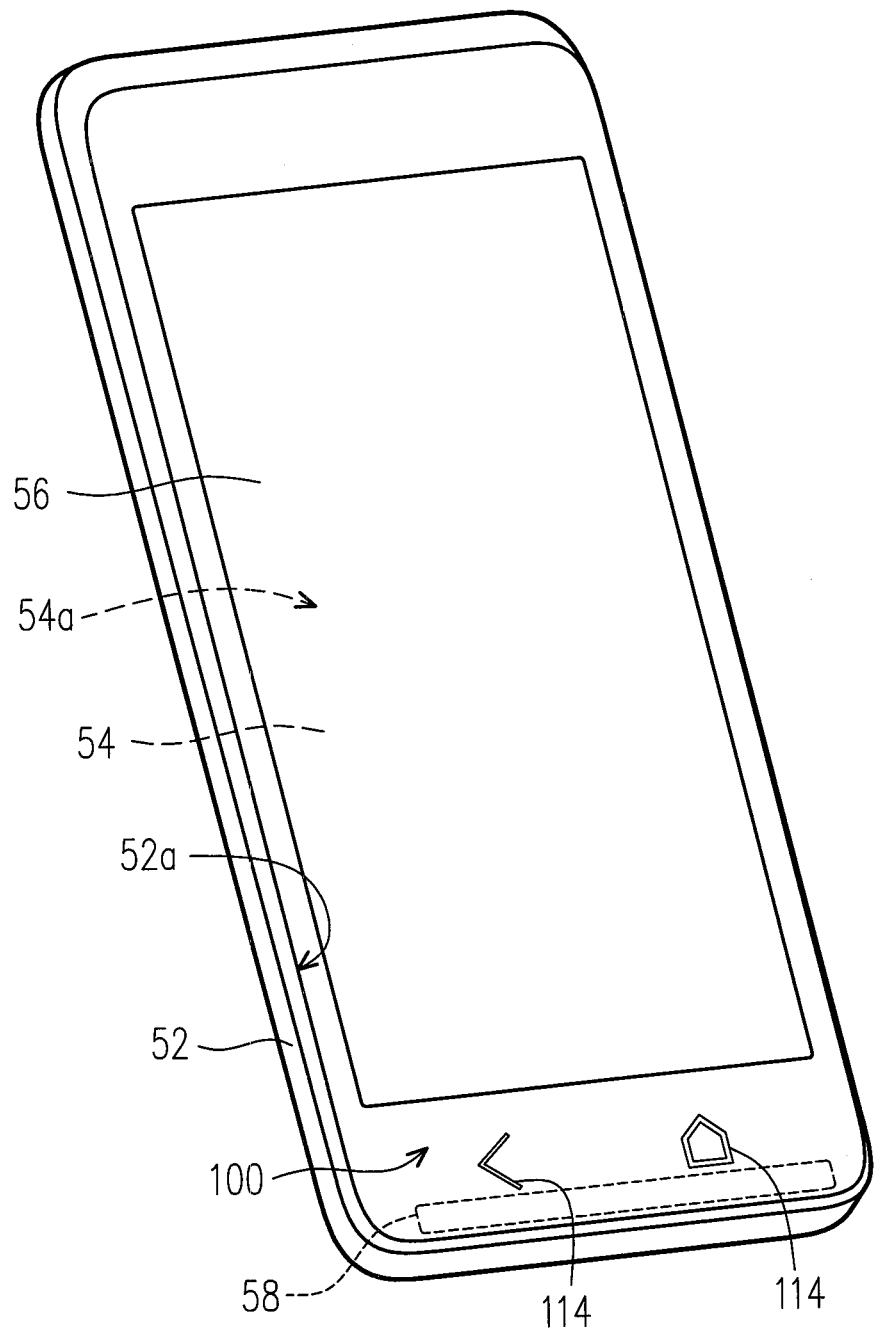
FIG. 1 is a schematic diagram illustrating an electronic device according to an embodiment of the disclosure.

FIG. 1 is a schematic diagram illustrating an electronic device 50 according to an embodiment of the disclosure.

Referring to FIG. 1, in the present embodiment, the electronic device 50 includes a casing 52, a display module 54, a transparent cover 56, an antenna 58 and a touch panel assembly 100. The casing 52 has an opening 52a. The display module 54 is disposed within the casing 52, and the opening 52a exposes a display surface 54a of the display module 54. The antenna 58 is disposed within the casing 52, and the transparent cover 56 is disposed on the display module 54 and the touch panel assembly 100 and covers the opening 52a. In the present embodiment, the electronic device 50, for example, is a smart phone or other electronic device having display and touch functions, and the disclosure does not intend to limit the types of the electronic device.

Figure 2:
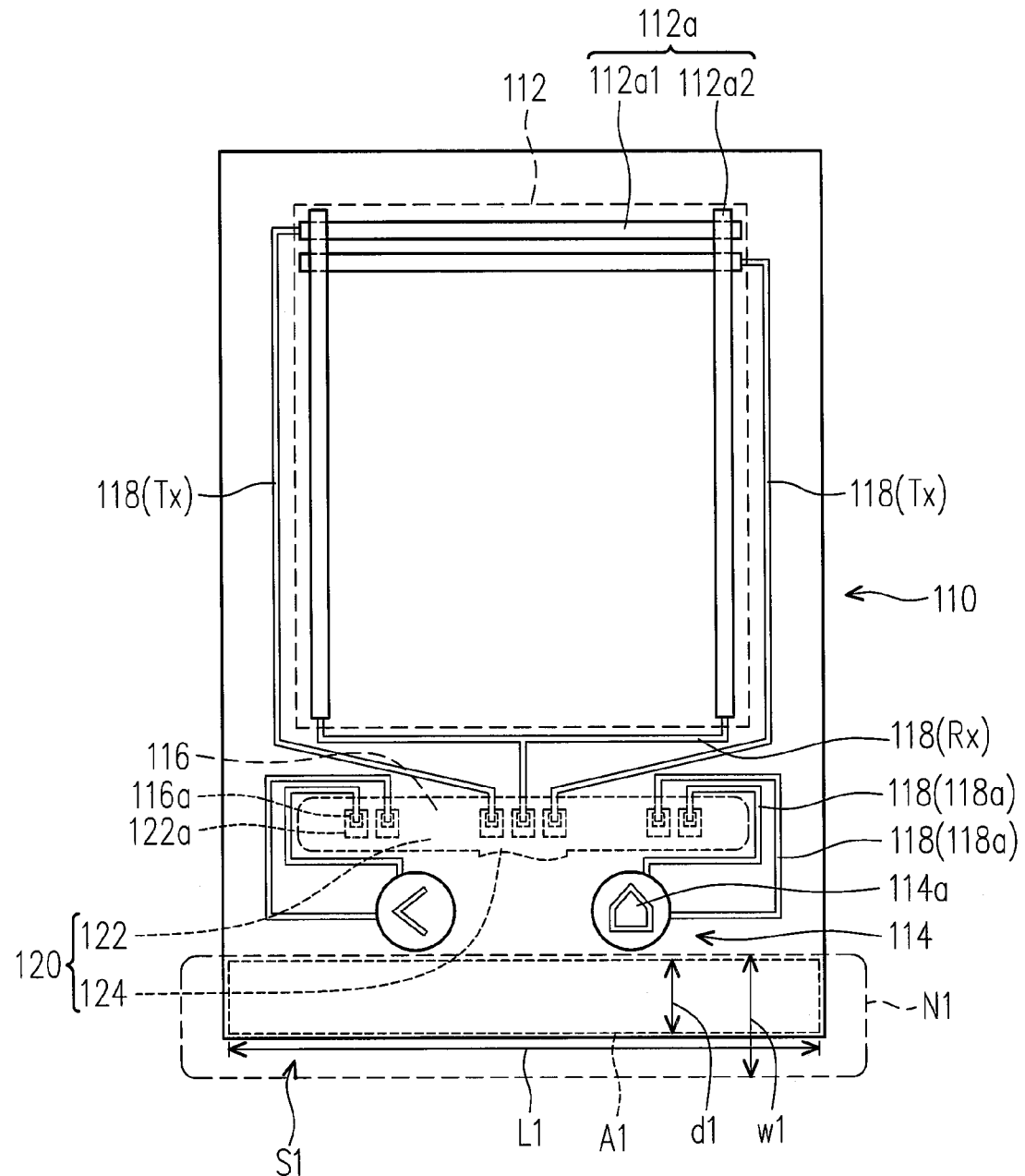
FIG. 2 is a schematic diagram illustrating a touch panel assembly of FIG. 1.

FIG. 2 is a schematic diagram illustrating a touch panel assembly 100 of FIG. 1. Referring to FIG. 1 and FIG. 2, in the present embodiment, the touch panel assembly 100 includes a touch panel 110 and a flexible printed circuit board 120. The touch panel 110 is disposed on the display surface 54a of the display module 54. The touch panel 110 includes a sensing area 112, an input element 114, a bonding area 116 and a plurality of connecting traces 118. The sensing area 112 has a sensing array 112a. The input element 114 is located at a side of the sensing area 112. The bonding area 116 is located between the sensing area 112 and the input element 114. The connecting traces 118 includes the first connecting traces and the second connecting traces, wherein the first connecting traces are connected with the sensing area 112 respectively and extend into the bonding area 116, and the second connecting traces are connected with the input element 114 respectively and extend into the bonding area 116.

Specifically, in the present embodiment, the sensing array 112a is composed by a plurality of sensing units 112a1 and 112a2 arranged along two directions that are perpendicular to each other, but the disclosure does not intend to limit the shape and the arrangement of the sensing units 112a1 and 112a2. The connecting traces 118 include signal transmission lines Tx and Rx (first connecting traces) configured to connect with the sensing units 112a1 and 112a2 of the sensing array 112a respectively and extend into the bonding area 116, wherein only a part of the signal transmission lines Tx and Rx and a part of the sensing units 112a1 and 112a2 are illustrated in FIG. 2, and indeed, the touch panel 110 may have a plurality of the signal transmission lines Tx and Rx, and the sensing array 112a of the sensing area 112 may have a plurality of sensing units 112a1 and 112a2.

Moreover, in the present embodiment, the touch panel 110 has two input elements 114, the input elements 114 are substantially arranged along a direction parallel to a side S1 of the touch panel 110, but the disclosure does not intend to limit the amount and the arrangement of the input elements 114, such that the amount and the arrangement of the input elements 114 may be adjusted according to actual requirements. The connecting traces 118 further include input connecting traces 118a (second connecting traces) configured to connect with the input elements 114 and extend into the bonding area 116. The input elements 114, for example, are virtual keys 114a, and the virtual keys 114a are connected to the bonding area 116 through the input connecting traces 118a, so that a user can operate the touch panel 110 through touching the input elements 114. Accordingly, the sensing area 112 and the input elements 114 of the touch panel 110 of the present embodiment are electrically connected to the bonding area 116 through the connecting traces 118 (the first connecting traces and the second connecting traces). Thus, the touch panel assembly 100 has favorable wiring.

On the other hand, the flexible printed circuit board 120 has a bonding portion 122. The flexible printed circuit board 120 is attached to the bonding area 116 through the bonding portion 122, and is electrically connected to the connecting traces 118 (including the first connecting traces and the second connecting traces) and to the sensing area 112 and the input elements 114 correspondingly through the connecting traces 118. Specifically, the bonding area 116 has a plurality of pads 116a disposed within the bonding area 116 and electrically connect to the corresponding connecting traces 118 respectively. The bonding portion 122 of the flexible printed circuit board 120 has a plurality of terminals 122a correspondingly connected to the pads 116a. Further, the signal transmission lines Tx and Rx (the first connecting traces) and the input connecting traces 118a (the second connecting traces) of the connecting traces 118 connect the sensing units 112a1 and 112a2 and the input elements 114 to the corresponding pads 116a, respectively. Therefore, when the flexible printed circuit board 120 is attached to the bonding area 116 through the bonding portion 122, the terminals 122a of the bonding portion 122 are correspondingly connected to the pads 116a, so that the flexible printed circuit board 120 is electrically connected the sensing area 112 and the input elements 114 through the connecting traces 118. Accordingly, the touch panel assembly 100 can connect the sensing area 112 and the input elements 114 via the same flexible printed circuit board 120 without requiring the use of additional flexible printed circuit board 120 for connecting the input elements 114. Hence, the touch panel assembly 100 and the electronic device 50 can omit the use of additional flexible printed circuit board and lower the production cost.

Moreover, in the present embodiment, when the transparent cover 56 (illustrated in FIG. 1) is disposed on the touch panel assembly 100 and covers the opening 52a, the transparent cover 56 is usually attached on the touch panel 110 via an adhesive (not shown), wherein the adhesive is coated at the surrounding area of the transparent cover 56 so as to avoid influencing the operations of the sensing area 112 and the input elements 114 of the touch panel 110. Now, since the bonding area 116 of the present embodiment is located between the sensing area 112 and the input elements 114, the adhesive coated at the surrounding area of the transparent cover 56 does not influence the bonding area 116 and the connecting traces 118 extending to the bonding area 116. Therefore, the attachment between the transparent cover 56 and the touch panel assembly 100 does not produce interferences to the bonding area 116, the connecting traces 118 and the flexible printed circuit board 120 attached to the bonding area 116.

Referring to FIG. 1 and FIG. 2, in the present embodiment, the sensing units 112a1 and 112a2 within the sensing area 112 and the input elements 114 (which are the virtual keys 114a) are, for example, conductive films or conductive electrodes formed by indium tin oxide (ITO) or other transparent conductive materials, and the pads 116a located within the bonding area 116 and terminals 122a located on the bonding portion 122 are conductive pads and conductive terminals, respectively. In addition, the connecting traces 118 also have conductivity and are traces formed by conductive materials such as metal or indium tin oxide. The connecting traces 118 are configured to electrically connect the sensing array 112a of the sensing area 112 and the input elements 114 to the pads 116a of the bonding area 116, and to be electrically connected to the terminals 122a of the bonding portion 122 of the flexible printed circuit board 120. Hence, when an orthogonal projection of the antenna 58 or the casing being used as the antenna structure is disposed with the aforementioned conductive components thereon, or an orthogonal projection of the antenna 58 or the casing being used as the antenna structure on the touch panel 110 is overlapped with the location of the aforementioned conductive components or region, the antenna 58 or the antenna structure is subjected to an interference of the aforementioned structures or region, thereby influencing efficiency and bandwidth of the signal transmission.

Therefore, in the present embodiment, the touch panel 110 further includes a clearance zone A1, wherein the clearance zone A1 is substantially not overlapped with the sensing area 112, the input elements 114, the bonding area 116, the connecting traces 118 (including the first connecting traces and the second connecting traces) and the bonding portion 122 of the flexible printed circuit board 120. In other words, the clearance zone A1 of the present embodiment and the location of the aforementioned conductive components or region are substantially not overlapped. A width d1 of the clearance zone A1 is greater than 0.5 mm and less than 3.0 mm, and a length L1 of the clearance zone A1 is greater than 30 mm and less than 100 mm. Since the clearance zone A1 and the location of the aforementioned conductive components or region are substantially not overlapped, the antenna may have favorable signal transmission efficiency and bandwidth by disposing the antenna 58 or the portion of the casing 52 being used as the antenna structure within the clearance zone A1, or by corresponding the orthogonal projection of the antenna 58 or the portion of the casing 52 being used as the antenna structure on the touch panel 110 to clearance zone A1. However, the disclosure also does not intend to limit that the antenna 58 or the antenna structure must be completely corresponded to the clearance zone A1, the interference of the conductive components or region to the antenna 58 or the antenna structure may be lowered as long as the antenna 58 or the antenna stricture can be partially corresponded to the clearance zone A1.

For instance, referring to FIG. 1 and FIG. 2, in the present embodiment, the antenna 58 is disposed within the casing 52 and corresponded to the clearance zone A1. Further, the antenna 58 produces an orthogonal projection N1 on the touch panel 110, wherein the orthogonal projection N1 of the antenna 58 on the touch panel 110 is located within the clearance zone A1 and does not overlap with the sensing area 112, the input elements 114, the bonding area 116, the connecting traces 118 and the bonding portion 122 of the flexible printed circuit board 120. Even further, the orthogonal projection N1 of the antenna 58 of the present embodiment on the touch panel 110 is located between the input elements 114 and the side S1 of the touch panel 110. The antenna 58, for example, is a normal design antenna, and a width w1 of the orthogonal projection N1 thereof is 7.5 mm, but the disclosure does not intend to limit the type of the antenna 58. As such, the antenna 58 configured to transmit the signal is less likely to be subjected to the inferences of the sensing area 112, the input elements 114, the bonding area 116, the connecting traces 118 and the bonding portion 122 that have conductivity. However, in other embodiments, the orthogonal projection N1 of the antenna 58 on the touch panel 110 may also partially overlap with the clearance zone A1.

Figure 3:
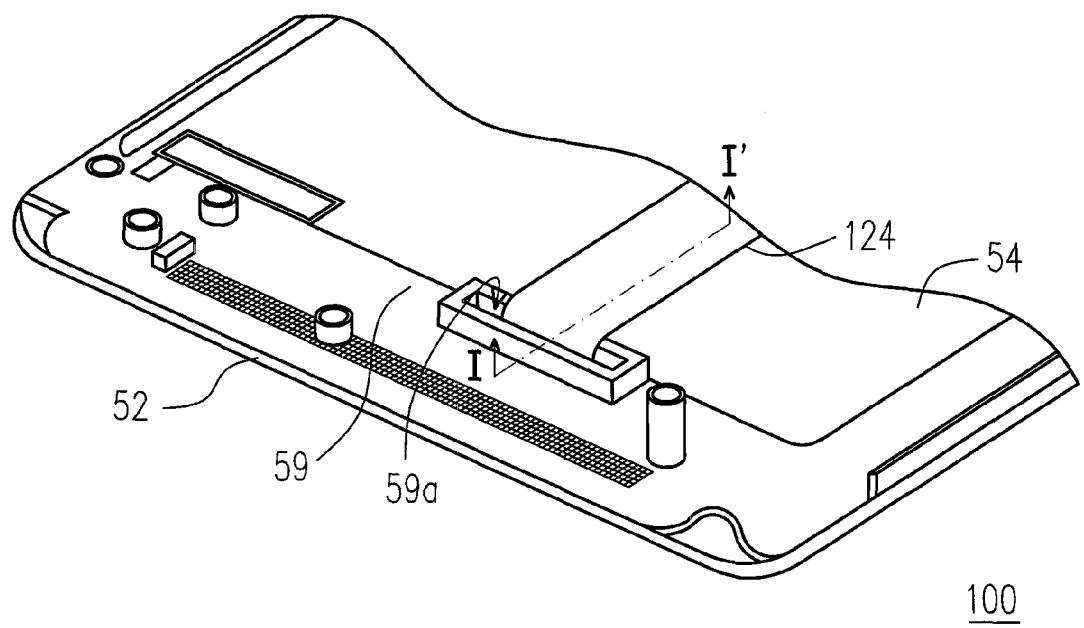
FIG. 3 is a partial schematic diagram illustrating the backside of the electronic device of FIG. 1.
Figure 4:
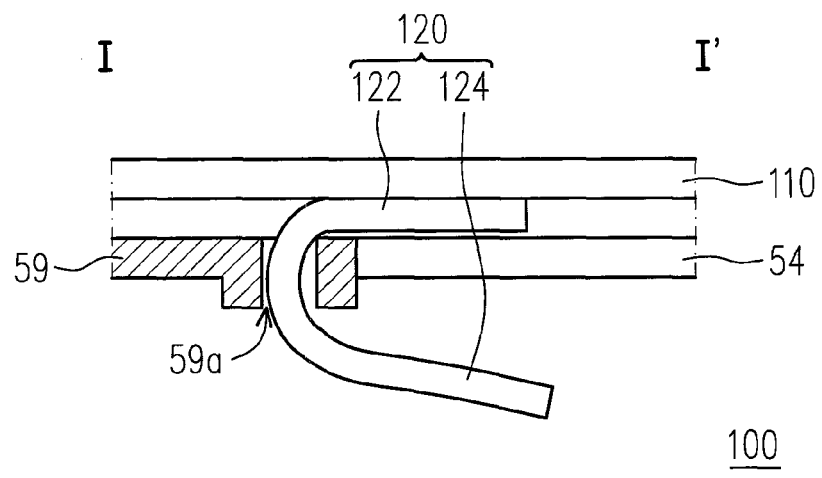
FIG. 4 is a cross-sectional diagram illustrating the backside of the electronic device of FIG. 3 along a profile line I-I'.

FIG. 3 is a partial schematic diagram illustrating the backside of the electronic device of FIG. 1. FIG. 4 is a cross-sectional diagram illustrating the backside of the electronic device of FIG. 3 along a profile line I-I'. As shown in FIG. 3 and FIG. 4, in the present embodiment, the flexible printed circuit board 120 has a main body 124 connected with the bonding portion 122. The bonding portion 122 and the main body 124 have different extending directions that are, for example, perpendicular to each other and appeared as 'T-shape'. When the flexible printed circuit board 120 is connected with the bonding area 116 of the touch panel 110 through the bonding portion 122, and the touch panel assembly 100 is assembled to the casing 52 together with components, such as the display module 54, the touch panel assembly 100 is disposed on the display surface 54a of the display module 54 (as shown in FIG. 1), and the main body 124 can be bended to a backside of the display module 54 that is toward a direction opposite to an extending direction thereof, and faces the bonding portion 122 across the display module 54 (as shown in FIG. 4), so as to bypass the display module 54. After the main body 124 is bended to the backside of the display module 54, the main body 124 may penetrate out of an opening 59a of a frame body 59. In addition, since the main body 124 of the flexible printed circuit board 120 may be bended to the backside of the display module 54 that is toward the direction opposite to the extending direction thereof and bypass the display module 54, an orthogonal projection of the flexible printed circuit board 120 (including the bonding portion 122 and the main body 124) on the touch panel 110 is substantially not overlapped with the clearance zone A1. As such, the orthogonal projection of the antenna 58 or the portion of the casing 52 being used as the antenna structure (such as the orthogonal projection N1 of the aforementioned antenna 58) on the touch panel 110 is less likely to be overlapped with the orthogonal projection of the main body 124 on the touch panel 110, so that the flexible printed circuit board 120 is substantially less likely to influence the normal operation of the antenna 58.

Figure 5:
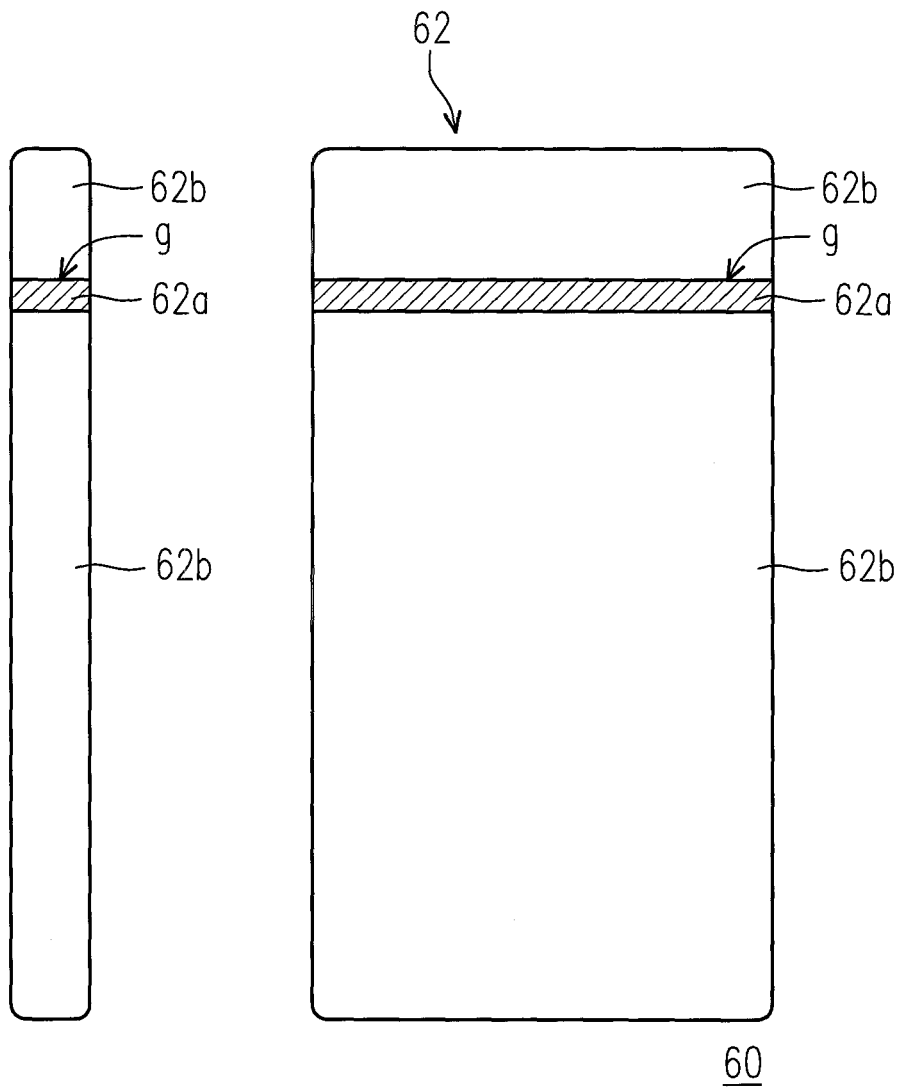
FIG. 5 is a schematic diagram illustrating a backside and a side of an electronic device according to another embodiment.

FIG. 5 is a schematic diagram illustrating a backside and a side of an electronic device 60 according to another embodiment. Referring to FIG. 1 through FIG. 5, in the present embodiment, the electronic device 60 also has a configuration similar to that of the electronic device 50 shown in FIG. 1, wherein the electronic device 60, instead of being disposed with the antenna 58, uses a portion of a casing 62 that couples to the internal body (not shown) as the antenna structure. Specifically, referring to FIG. 5, FIG. 5 illustrated a backside and a side of the casing 62 of the electronic device 60. In the preset embodiment, the casing 62, for example, is a metal casing. The casing 62 substantially is a hollow structure and has a gap g. The gap g may completely disconnect the casing 62, as the side view shown in FIG. 5, but the gap g may also partially separate the casing 62. In addition, the casing 62 has a non-conductive separator 62a thereon, and the non-conductive separator 62a is partially disposed within the gap g, so as to separate the casing 62 into two blocks 62b. Certainly, in other embodiments, the casing 62 may have a plurality of gaps and have a plurality of non-conductive separators disposed within the gaps, so as to separate the casing 62 into a plurality of blocks; the disclosure dose not intend to limit the amounts and locations of the gap, the non-conductive separator and the block.

In the present embodiment, the casing 62 may cover the display module 54, the transparent cover 56, the touch panel assembly 100 and the internal body (not shown), so as to constitute the electronic device 60. The casing 62 is coupled to the internal body of the electronic device 60, wherein the internal body has a signal feeding member (not shown) configured to receive signals and transmit the signals to the internal body. Therefore, when the casing 62 is coupled to the internal body and corresponded to the signal feeding member, the signal feeding member, the internal body and the casing 62 may together form an antenna structure, wherein the internal body is a major radiator, the casing 62 is an extend radiator, and the signal feeding member is configured to excite the antenna structure. Accordingly, the antenna of the electronic device 60 of the present embodiment is disposed on the casing 62 of the electronic device 60, and thus does not additionally required to be disposed with the antenna 58 shown in FIG. 1. The present embodiment uses the casing 62 as the antenna, and the casing 62 coupled to the signal feeding member may use the gap g and the non-conductive separator 62a located therein as feeding points for the signals from the antenna, so as to transmit the signals to the internal body through the signal feeding member. When the casing 62 and the aforementioned components, such as the display module 54, the transparent cover 56 and the touch panel assembly 100, constitute the electronic device 60, the location for disposing the gap g is corresponded to the clearance zone A1 of the touch panel 110. As such, electromagnetic wave may be transmitted or received by the antenna structure through the gap g of the casing 62, so that the antenna structure can maintain favorable radiation efficiency. However, the disclosure does not intend to limit that the orthogonal projection of the gap g on the touch panel 110 must be completely overlap with the clearance zone A1, the abovementioned effects may be achieved as long as the orthogonal projection of the gap g on the touch panel 110 is partially overlapped with the clearance zone A1.

Figure 6:
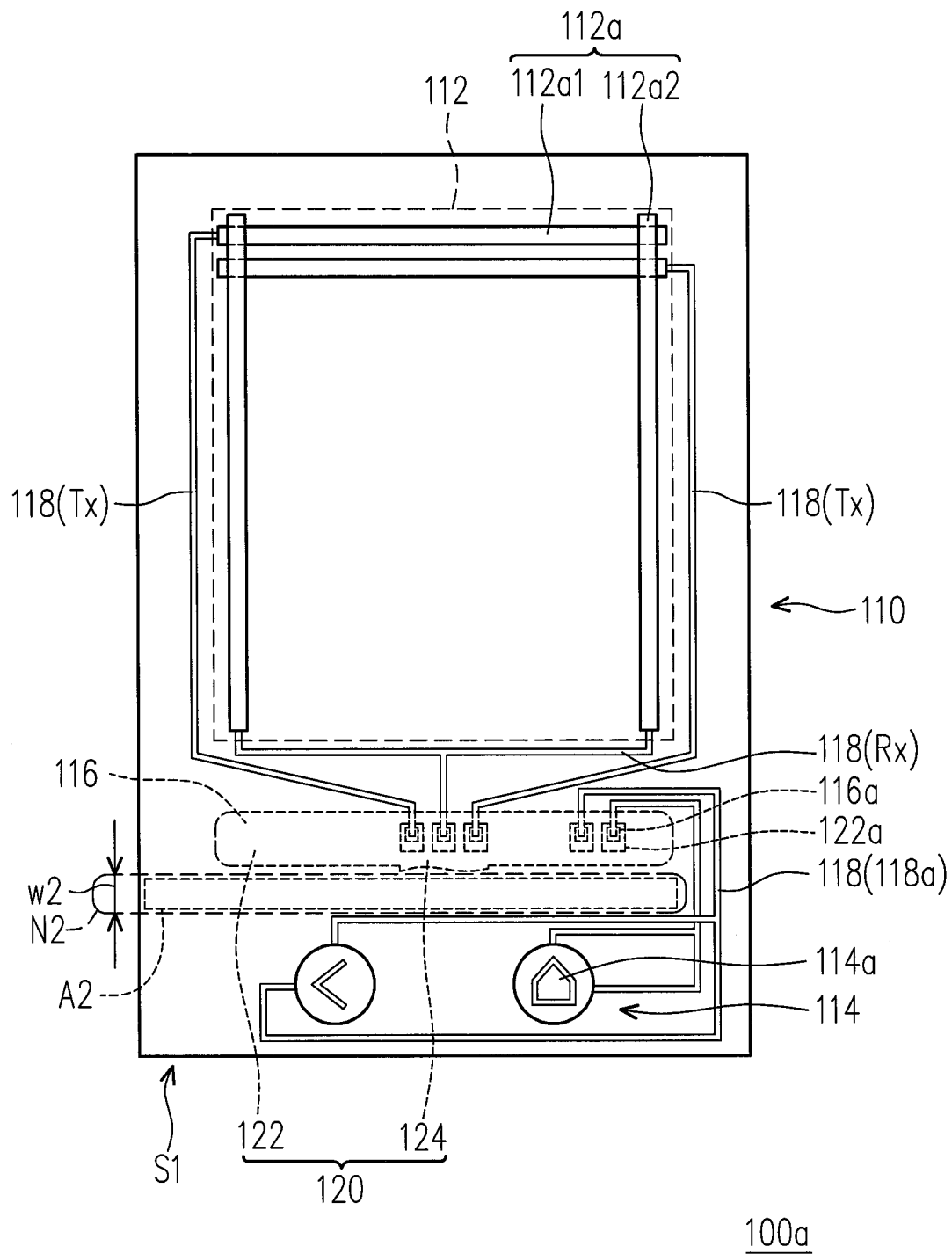
FIG. 6 is a schematic diagram illustrating a touch panel assembly according to another embodiment.

FIG. 6 is a schematic diagram illustrating a touch panel assembly 100a according to another embodiment. Referring to FIG. 1 and FIG. 6, in the present embodiment, the touch panel assembly 100a may also be applied to the electronic device 50 shown in FIG. 1. A major difference between the touch panel assembly 100a and the touch panel assembly 100 is that a location of a clearance zone A2 of the present embodiment is different from a location of the clearance zone A1. Similarly, the clearance zone A2 is substantially not overlapped with the sensing area 112, the input elements 114, the bonding area 116, the connecting traces 118 (including the first connecting traces and the second connecting traces) and the flexible printed circuit board 120 (including the bonding portion 122 and the main body 124). In other words, the clearance zone A2 of the present embodiment is substantially not overlapped with the location of the aforementioned conductive structures or region. Therefore, a location of an orthogonal projection N2 of an antenna (not shown) disposed within the casing on the touch panel 110 is within the clearance zone A2 and different from the location of the orthogonal projection N1 of the antenna 58 on the touch panel 110. In the present embodiment, the antenna, for example, is a slot design antenna, and a width w2 of the orthogonal projection N2 thereof produced on the touch panel 110 is 1.5 mm. Hence, in the present embodiment, the orthogonal projection N2 of the antenna on the touch panel 110 is located between the input elements 114 and the bonding area 116. As such, the space configuration of the touch panel assembly 100a is more efficient, so that the orthogonal projection N2 of the antenna on the touch panel 110 does not overlap with the conductive components or region, such as the sensing area 112, the input elements 114, the bonding area 116, the connecting traces 118 and bonding portion 122, and thus the antenna is avoided from being interfered by the conductive components and influencing the operation of the antenna. In addition, similar to the previous embodiments, the present embodiment may also bend the main body 124 of the flexible printed circuit board 120 to the backside of the display module 54 to obtain the results shown in FIG. 3 and FIG. 4. Certainly, under the premise of not influencing attachment reliability of the flexible printed circuit board 120, the position of the main body 124 being bended may be adjusted. For instance, the position of the main body 124 being bended is to be avoided from the clearance zone A2 as far as possible, and thus the flexible printed circuit board 120 is bended at an intersection of the main body 124 and the bonding portion 122, so that the entire main body 124 is bended to the backside of the display module 54. However, the disclosure does not intend to limit that the orthogonal projection N2 of the antenna 58 on the touch panel 110 must be completely overlapped with the clearance zone A2, the above-mentioned effects may be achieved as long as the orthogonal projection N2 is partially overlapped with the clearance zone A2. Moreover, the previous embodiment that uses the casing 62 (as shown in FIG. 5) as the antenna structure may also be applied to the touch panel assembly 110a of the present embodiment, and the condition of the antenna being interfered by the conductive components may also be improved through partially or completely corresponding the gap g of the casing 62 to the clearance zone A2.

In summary, the touch panel assembly of the disclosure include the touch panel and the flexible printed circuit board, wherein the bonding area of the touch panel is located between the sensing area and the input element, so that the sensing area and the input element may electrically connect to the bonding area located therebetween through the first connecting traces and the second connecting traces respectively, and the flexible printed circuit board is attached to the bonding area through the bonding portion, so that the sensing area and the input element are electrically connected to the flexible printed circuit board through the first connecting traces and the second connecting traces. In addition, the clearance zone of the touch panel is substantially not overlapped with the conductive components or region, such as the sensing area, the input element, the bonding area, the first connecting traces, the second connecting traces and the bonding portion and the main body of the flexible printed circuit board, and the antenna or the casing (being used as the antenna) of the electronic device may substantially be corresponded to the clearance zone to enable the antenna to maintain the normal operation. As such, the touch panel assembly of the disclosure has favorable wiring, and the input element is disposed on the touch panel, so that the touch panel assembly and the electronic device may omit the use of additional flexible printed circuit board for producing the input element, thereby lowering the production cost.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A touch panel assembly comprising:
   a touch panel comprising:
      a sensing area having a sensing array;
      at least one input element located at a side of the sensing area;
      a bonding area located between the sensing area and the input element; and
      a plurality of first connecting traces connected with the sensing array respectively and extending into the bonding area;
      a plurality of second connecting traces connected with the input element respectively and extending into the bonding area; and
   a flexible printed circuit board having a bonding portion, wherein the flexible printed circuit board is attached to the bonding area through the bonding portion, and is electrically connected to the first connecting traces and the second connecting traces.

2. The touch panel assembly as recited in claim 1, wherein the bonding area has a plurality of pads disposed within the bonding area and electrically connect to the corresponding first connecting traces and second connecting traces respectively, and the bonding portion of the flexible printed circuit board has a plurality of terminals correspondingly connected to the pads.

3. The touch panel assembly as recited in claim 1, wherein the at least one input element comprises two input elements substantially arranged along a direction parallel to a side of the touch panel.

4. The touch panel assembly as recited in claim 1, wherein the at least one input element is a virtual key, and the virtual key is connected to the bonding area through the corresponding second connecting trace.

5. The touch panel assembly as recited in claim 1, wherein the touch panel further comprises a clearance zone, wherein the clearance zone is substantially not overlapped with the sensing area, the at least one input element, the bonding area, the first connecting traces, the second connecting traces and the bonding portion of the flexible printed circuit board.

6. The touch panel assembly as recited in claim 5, wherein the flexible printed circuit board has a main body connected with the bonding portion, the main body is bended toward a direction opposite to an extending direction thereof and faces the bonding portion, so that an orthogonal projection of the flexible printed circuit board on the touch panel is substantially not overlapped with the clearance zone.

7. The touch panel assembly as recited in claim 5, wherein a width of the clearance zone is greater than 0.5 mm and less than 3.0 mm, and a length of the clearance zone is greater than 30 mm and less than 100 mm.

8. An electronic device comprising:
a casing having an opening;
a display module disposed within the casing, the opening exposing a display surface of the display module; and
a touch panel assembly disposed within the casing, the touch panel assembly comprising:
a touch panel disposed on the display surface, the touch panel comprising:
a sensing area having a sensing array;
at least one input element located at a side of the sensing area;
a bonding area located between the sensing area and the input element; and
a plurality of first connecting traces connected with the sensing array respectively and extending into the bonding area;
a plurality of second connecting traces connected with the input element respectively and extending into the bonding area; and
a flexible printed circuit board having a bonding portion, wherein the flexible printed circuit board is attached to the bonding area through the bonding portion, and is electrically connected to the first connecting traces and the second connecting traces.

9. The electronic device as recited in claim 8, wherein the bonding area has a plurality of pads disposed within the bonding area and electrically connected with the corresponding first connecting traces and second connecting traces respectively, and the bonding portion of the flexible printed circuit board has a plurality of terminals correspondingly connected to the pads.

10. The electronic device as recited in claim 8, wherein the at least one input element comprises two input elements substantially arranged along a direction parallel to a side of the touch panel.

11. The electronic device as recited in claim 8, wherein the flexible printed circuit board has a main body connected with the bonding portion, and the main body is bended toward a direction opposite to an extending direction thereof and faces the bonding portion, and bypassing the display module.

12. The electronic device as recited in claim 8, wherein the at least one input element is a virtual key, and the virtual key is connected to the bonding area through the corresponding second connecting trace.

13. The electronic device as recited in claim 8 further comprising:
a transparent cover disposed on the touch panel assembly and covering the opening.

14. The electronic device as recited in claim 8, wherein the touch panel further comprising a clearance zone, wherein the clearance zone is substantially not overlapped with the sensing area, the at least one input element, the bonding area, the first connecting traces, the second connecting traces and the bonding portion of the flexible printed circuit board.

15. The electronic device as recited in claim 8 further comprising:
an antenna disposed within the casing, wherein an orthogonal projection of the antenna on the touch panel is located between the at least one input element and the side of the touch panel.

16. The electronic device as recited in claim 8 further comprising:
an antenna disposed within the casing, wherein an orthogonal projection of the antenna on the touch panel is located between the at least one input element and the bonding area.

17. The electronic device as recited in claim 14, wherein the flexible printed circuit board has a main body connected with the bonding portion, and the main body is bended toward a direction opposite to an extending direction thereof and faces the bonding portion, so that an orthogonal projection of the flexible printed circuit board on the touch panel is substantially not overlapped with the clearance zone.

18. The electronic device as recited in claim 14, wherein a width of the clearance zone is greater than 0.5 mm and less than 3.0 mm, and a length of the clearance zone is greater than 30 mm and less than 100 mm.

19. The electronic device as recited in claim 14 further comprising:
an antenna disposed on the casing of the electronic device, wherein the casing has a gap, and the gap is disposed at a location corresponding to the clearance zone.

20. The electronic device as recited in claim 14 further comprising:
an antenna disposed within the casing and corresponded to the clearance zone.

* * * * *